(12) United States Patent
Reumerman et al.

(10) Patent No.: US 8,942,188 B2
(45) Date of Patent: Jan. 27, 2015

(54) REDUCING BEACON COLLISION PROBABILITY

(75) Inventors: Hans-Juergen Reumerman, Eindhoven (NL); Yunpeng Zang, Aachen (DE); Lothar Stibor, Aachen (DE); Bernhard Walke, Wuerselen (DE); Hong Ma, Stein (DE)

(73) Assignee: Koninklijke Philips N.V., Eindhoven (NL)

( * ) Notice: Subject to any disclaimer, the term of this patent is extended or adjusted under 35 U.S.C. 154(b) by 1092 days.

(21) Appl. No.: 12/673,990

(22) PCT Filed: Aug. 22, 2008

(86) PCT No.: PCT/IB2008/053384
§ 371 (c)(1),
(2), (4) Date: Feb. 18, 2010

(87) PCT Pub. No.: WO2009/024950
PCT Pub. Date: Feb. 26, 2009

(65) Prior Publication Data
US 2011/0026472 A1 Feb. 3, 2011

(30) Foreign Application Priority Data

Aug. 22, 2007 (EP) .................................... 07301318

(51) Int. Cl.
*H04W 4/00* (2009.01)
*H04J 3/00* (2006.01)
(Continued)

(52) U.S. Cl.
CPC .............. *H04W 72/02* (2013.01); *H04W 28/04* (2013.01); *H04W 72/0406* (2013.01); *H04W 74/08* (2013.01); *H04W 84/18* (2013.01)
USPC ............ 370/329; 370/345; 370/348; 370/445

(58) Field of Classification Search
CPC .. H04W 72/0406; H04W 72/02; H04W 28/04
USPC .................................. 370/329, 345, 348, 445
See application file for complete search history.

(56) References Cited

U.S. PATENT DOCUMENTS

2003/0174690 A1 9/2003 Benveniste
2005/0226203 A1 10/2005 Ho
(Continued)

FOREIGN PATENT DOCUMENTS

WO 2005076533 A1 8/2005
WO 2006111826 A1 10/2006
WO 2007008174 A1 1/2007

*Primary Examiner* — Noel Beharry
*Assistant Examiner* — Farhad Ali
(74) *Attorney, Agent, or Firm* — Larry Liberchuk

(57) ABSTRACT

The present invention relates to a method of reducing beacon collision probability in a communication network supporting control channels comprising beacon periods divided into beacon slots, each beacon period being followed by a contention period. In the method a communication device (101) operating in the communication network first chooses (503) an available beacon slot for transmission of a first type of beacon for exchanging network topology information with other communication devices operating in the communication network. Then the communication device transmits (515) a beacon of a second type comprising an identifier of the communication device and the chosen beacon slot for the transmission of the beacon of the first type, the beacon of the second type being transmitted in the contention period.

12 Claims, 6 Drawing Sheets

| (51) | Int. Cl. | |
|---|---|---|
| | *H04B 7/212* | (2006.01) |
| | *H04L 12/413* | (2006.01) |
| | *H04W 72/02* | (2009.01) |
| | *H04W 28/04* | (2009.01) |
| | *H04W 72/04* | (2009.01) |
| | *H04W 74/08* | (2009.01) |
| | *H04W 84/18* | (2009.01) |

(56) References Cited

U.S. PATENT DOCUMENTS

| | | |
|---|---|---|
| 2006/0018298 A1* | 1/2006 | Dilipkumar Jogi et al. .. 370/345 |
| 2006/0092909 A1* | 5/2006 | Ho ................................ 370/348 |
| 2006/0239220 A1 | 10/2006 | Celentano et al. |
| 2007/0025384 A1* | 2/2007 | Ayyagari et al. .............. 370/445 |

* cited by examiner

US 8,942,188 B2

REDUCING BEACON COLLISION PROBABILITY

TECHNICAL FIELD

The present invention relates to a method of reducing beacon collision probability in a communication system. The invention also relates to a corresponding computer program product and communication device.

BACKGROUND OF THE INVENTION

Ad-hoc wireless communication networks designed for stations with high mobility, e.g. vehicular ad-hoc networks (VANETs), require that each station has reliable and up-to-date information of its neighbourhood topology. In VANETs the neighbourhood information is advantageous, for instance, to cooperative driving and danger warning applications, as well as to packet routing and channel access coordination. To derive the neighbour topology information, stations in the communication range have to periodically exchange information with each other. A way of exchanging information is to use a beacon message, which broadcasts the information of the sender to its neighbouring stations. By receiving the beacons from the neighbours, a station can derive the current network topology in its vicinity. An efficient way of exchanging beacons is to use a specifically defined synchronised beacon period.

Beacon collision happens if at least two stations that are within a communication range choose the same beacon slot for transmission of a beacon signal. The probability of a beacon collision depends on the number of stations in the communication range and the total number of beacon slots available. However, in scenarios where the number of stations in the same communication range is large and the number of available beacon slots is limited, the beacon collision probability is relatively high. Also the time needed to solve a beacon collision may be longer.

The problem of having long beacon collision resolution time is more critical in wireless communication networks with high station mobility. This is due to high mobility which introduces more frequent topology changes and beacon collisions. In order to have a relatively stable network structure, the beacon collisions have to be solved rapidly.

Distributed wireless networks may be organised without a central coordinator. In these kinds of networks, like the WiMedia/multiband OFDMA alliance (MBOA) systems, stations transmit their beacons for coordinating the channel access and getting the neighbourhood information. The beacons are transmitted periodically in the synchronised interval, and a specifically designed beacon period consisting of multiple of beacon slots is used for beacon transmission in each interval.

United States patent application publication 2005/0226203 discloses a method, where a primary beacon is transmitted specifying an order at which other nodes are to transmit secondary beacons. The secondary beacons are then transmitted at the time specified in the primary beacon. Preferably, the secondary beacons comprise the same, or at least substantially the same, wireless access information as the primary beacon.

Thus, there is a need for an improved method of reducing beacon collision probability in communication systems.

SUMMARY OF THE INVENTION

According to a first aspect of the invention there is provided a method of reducing beacon collision probability in a communication system as recited in claim 1.

Thus, the present invention provides an efficient way of reducing beacon collisions and enhances the reliability of the distributed beaconing scheme. Furthermore, the present invention allows saving time when resolving beacon collisions. The teachings of the invention are especially beneficial in high mobility environment, where the neighbour topology changes constantly.

According to a second aspect of the invention there is provided a computer program product comprising instructions for implementing the method according the first aspect of the invention when loaded and run on computer means of the device.

According to a third aspect of the invention there is provided a communication device as recited in claim 10, the device being arranged for implementing the method according to the first aspect of the present invention.

Other aspects of the invention are recited in the dependent claims attached hereto.

BRIEF DESCRIPTION OF THE DRAWINGS

Other features and advantages of the invention will become apparent from the following description of non-limiting exemplary embodiments, with reference to the appended drawings, in which.

DETAILED DESCRIPTION OF EMBODIMENTS OF THE INVENTION

In the following description some non-limiting exemplary embodiments of the invention will be described in more detail in the context of VANET. However, it is to be understood that the invention is not restricted to this environment, but the teachings of the invention are equally applicable in other communication systems that take advantage of beacon signals.

Figure 1:
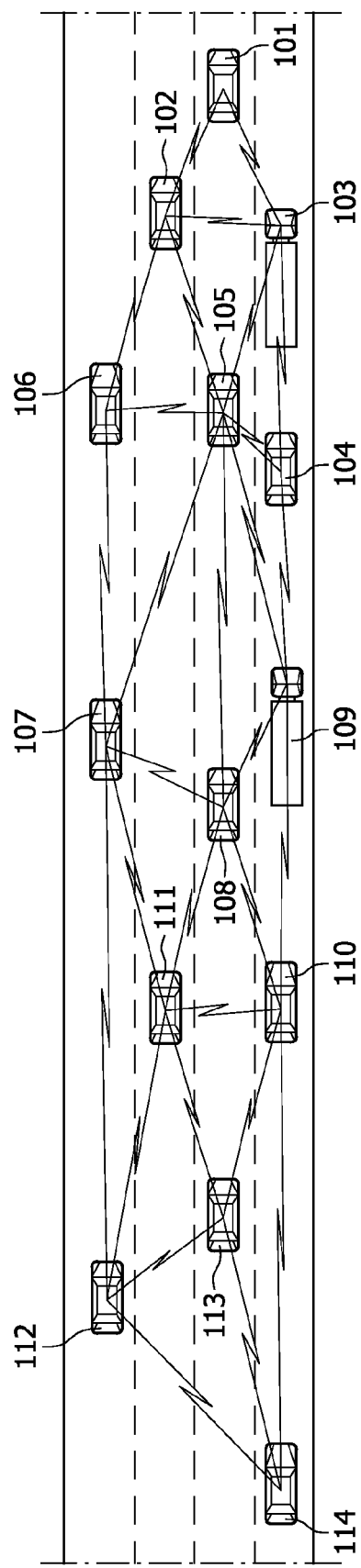
FIG. 1 shows a simplified example of a high mobility wireless communication network, where the teachings of the invention may be applied.

FIG. 1 shows an example of a structure of an ad-hoc wireless communication network, which in this example is operating in accordance with the IEEE 1609 standard. In the figure there are shown 14 communication devices or stations: a first device 101, a second device 102, a third device 103, etc. The devices in this example are vehicular on board units (OBUs) that are arranged to communicate with each other over radio interface.

In order to keep contact and update information to all neighbouring devices, every device should periodically broadcast a normal beacon in its communication range. A normal beacon frame usually carries multiple kinds of information such as the network topology information, mobility status information, e.g. vehicle velocity, acceleration/deceleration and direction, device service profiles information, device capability information, etc.

Figure 2:
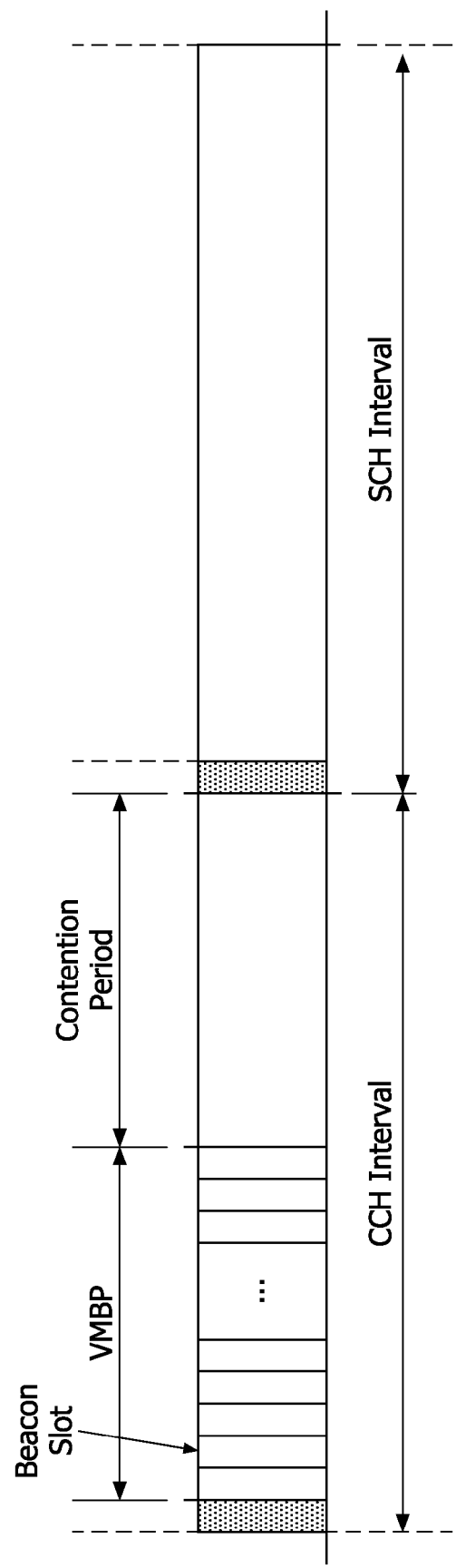
FIG. 2 shows a radio channel structure of a VANET along a timeline.

In synchronised systems, all stations follow the globally synchronised system structure, which includes a beacon period consisting of multiple beacon slots, as shown in FIG. 2. The channel structure shown in FIG. 2 is the one used in VANETs operating in accordance with the IEEE 1609 standard. In FIG. 2 there are shown two channel intervals, namely a control channel (CCH) interval and a service channel (SCH) interval. These intervals are globally synchronised. In the CCH interval every station has to stay on the control channel for the purpose of transmitting beacon signals, for instance for exchanging critical danger warning messages, while in the SCH interval stations can optionally switch to other service channels for performing non-safety applications, but before the starting time of the next CCH interval every station must switch back again to the control channel. As shown in FIG. 2, between the beacon period and the SCH interval, there is a contention period of which purpose in the present invention is explained later.

Figure 3:
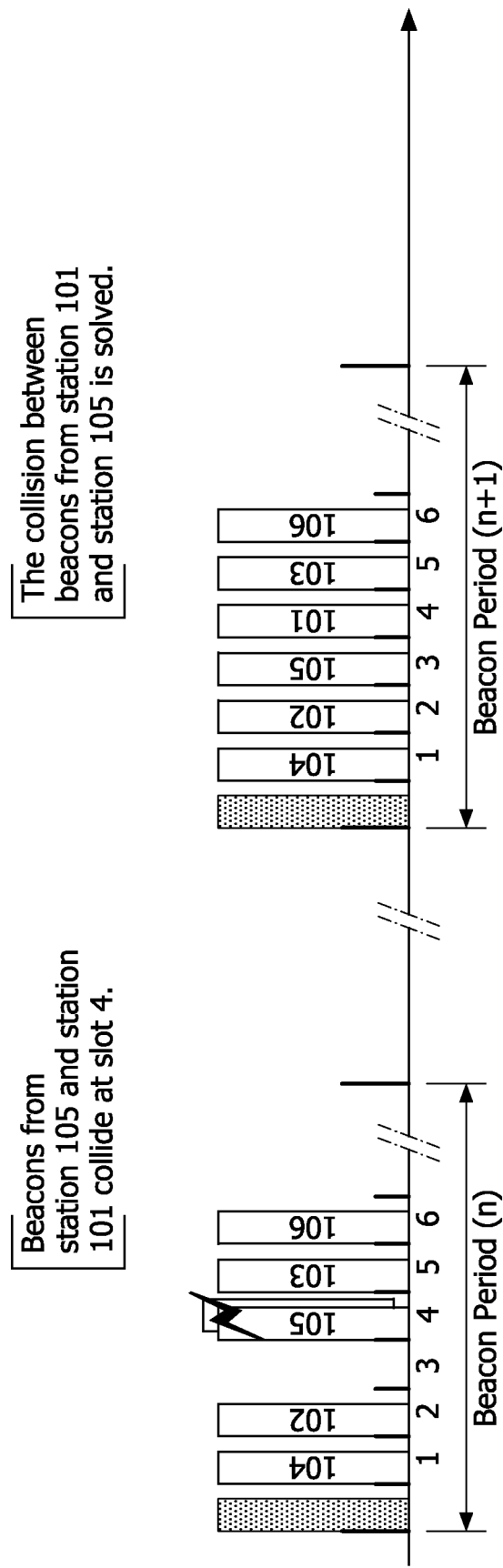
FIG. 3 shows an example of a beacon collision situation and a solution, where the problem has been solved.

Furthermore, each station has to find a unique beacon slot according to the reservation-ALOHA (R-ALOHA) rule, which means that each station randomly chooses a beacon slot and keeps this slot until a collision is detected on this slot within its communication range, i.e., someone in its or its neighbour's range chooses the same beacon slot. Once a collision has been detected, stations involved in the collision have to randomly choose available beacon slots again to resolve the collision. As shown in FIG. 3, in the nth beacon period the first station 101 and the fifth station 105 occasionally both choose slot 4 for their beacon transmission, and the collision is then reported by the third station 103. The first station 101 and the fifth station 105 have to randomly choose a new slot again to solve the collision in the next beacon period.

Figure 4:
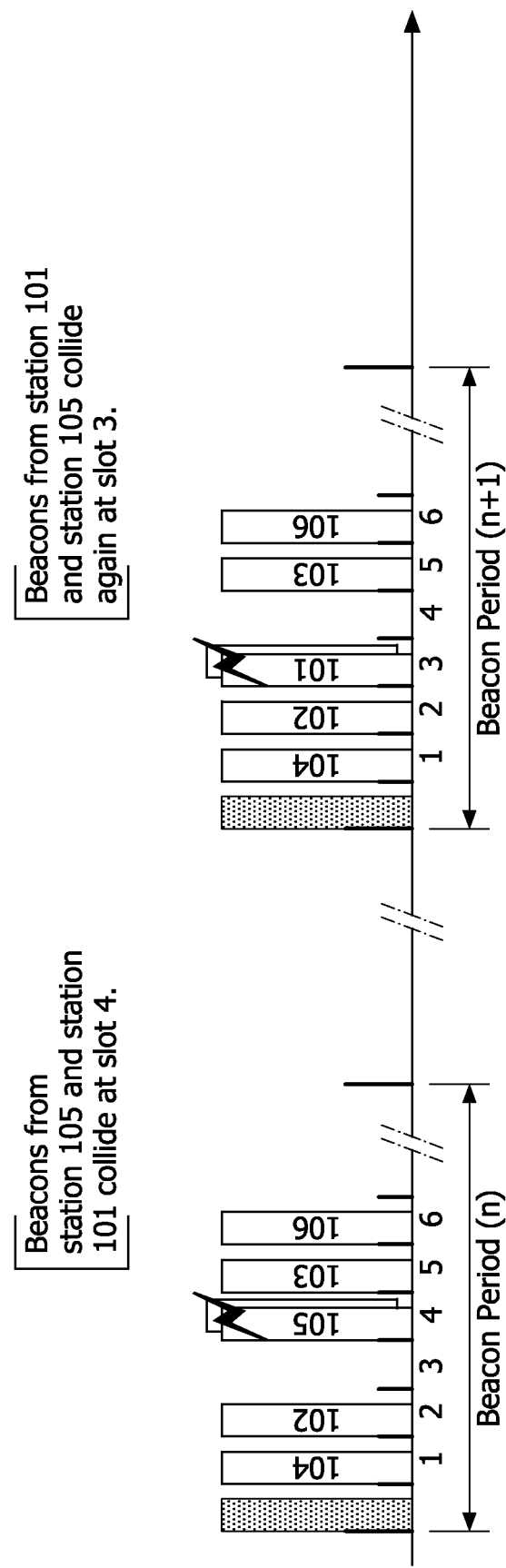
FIG. 4 shows an example of a beacon collision situation and how the problem remains unchanged even after it has been tried to be solved.

As shown in FIG. 4, beacons from the first station 101 and from the fifth station 105 collide at slot 4 in the nth beacon period. To solve the collision, the first station 101 and the fifth station 105 have to randomly pick up an available slot again for the next beacon period. But due to the limited number of available slots, the first station 101 and the fifth station 105 probably will choose again the same beacon slot and have to resolve the new beacon collision again.

Figure 5:
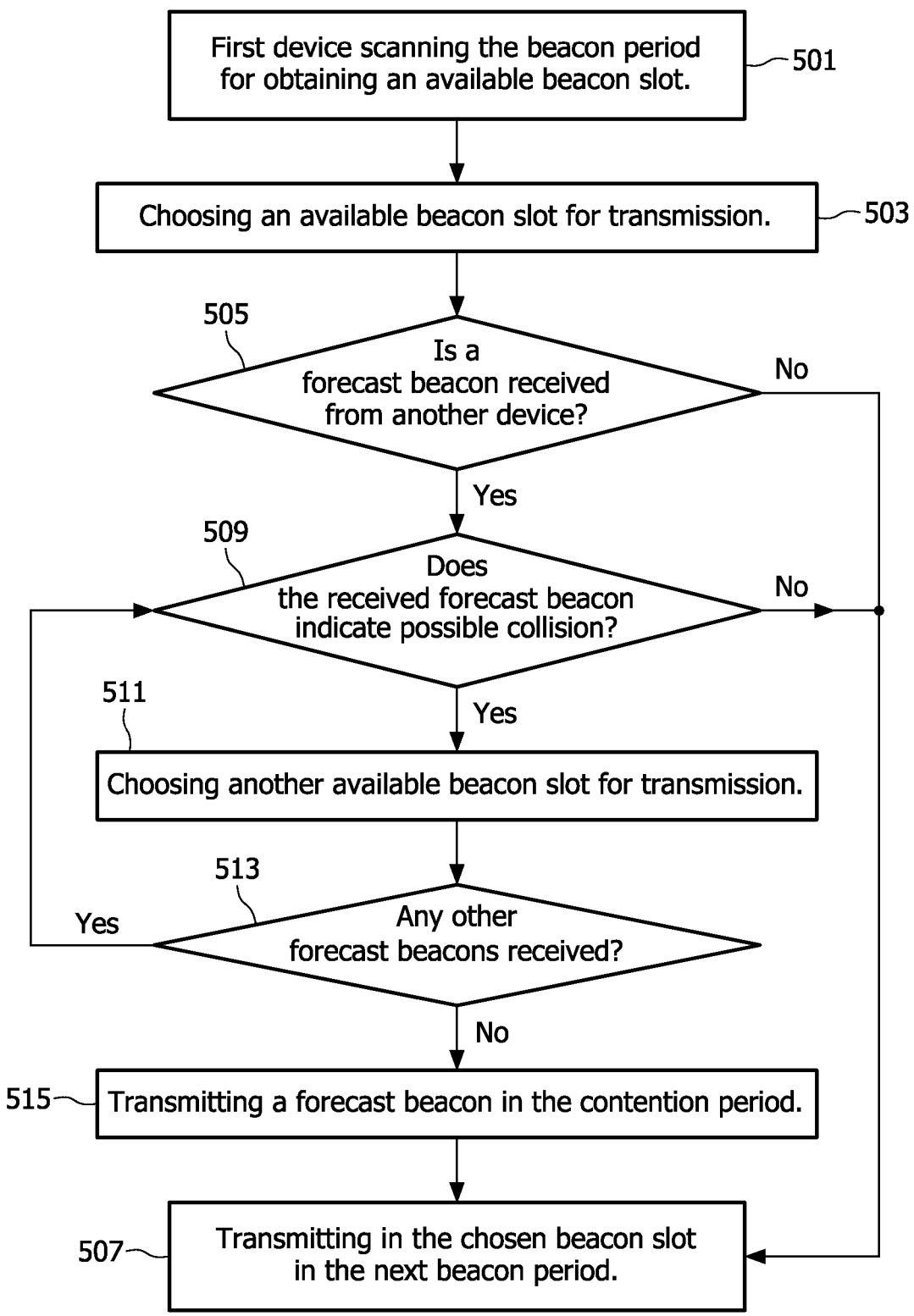
FIG. 5 is a flow chart describing an embodiment of a method in accordance with the present invention.
Figure 6:
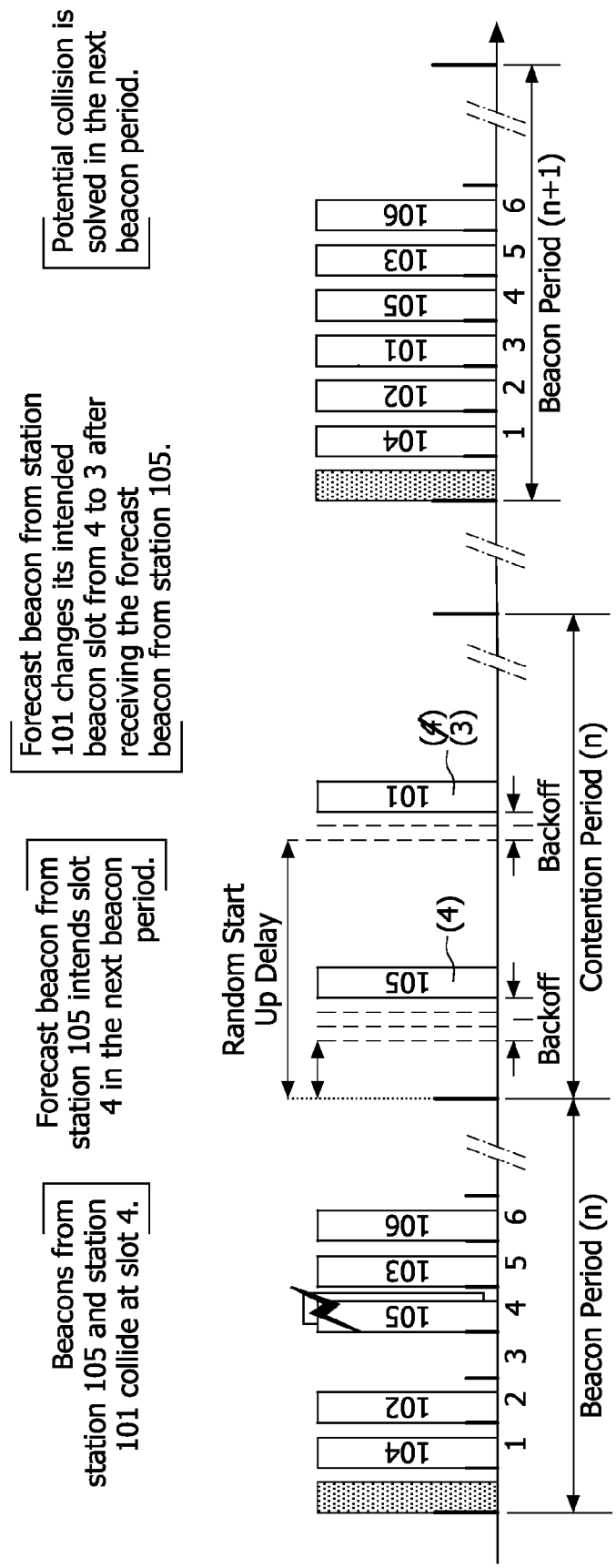
FIG. 6 shows an example of a beacon collision situation and how the problem is solved by taking advantage of collision warning beacons.

An embodiment of the invention is now described in detail with reference to the flow chart of FIG. 5 and FIG. 6. The method depicted in the flow chart of FIG. 5 can be applied in all wireless devices shown in FIG. 1, but in this example only the operation of the first communication device 101 is explained in more detail.

In step 501 the first device 101 scans the beacon period for finding an available beacon slot for transmitting a normal beacon. As shown in FIG. 6, in the beacon period n there has been a collision, because the first and fifth devices have both transmitted in slot 4. Now advantageously the whole beacon period is scanned for finding an available beacon slot. This is especially the case, when the first device 101 first starts up or has been involved in a beacon collision. Once the scan has been done, the first device 101 chooses in step 503 one of the available beacon slots. In this example the first available beacon slot is chosen.

Next in step 505 the first device 101 listens for possible beacon signals of a second type transmitted by other devices in the network. These beacon signals of the second type can be called forecast beacon signals. These forecast beacon signals are transmitted in the contention period to inform other devices in the network of the intention to transmit a normal beacon signal in a certain beacon slot. If no such forecast beacon signals are received, then the first device 101 transmits in step 507 the beacon signal in the chosen beacon slot in the next beacon period n+1.

However, if in step 505 it is detected that a forecast beacon signal is received, then in step 509 it is determined whether the forecast beacon indicates a possible collision. In this example as shown in FIG. 6, the forecast beacon is received from the fifth device 105 indicating that the fifth device 105 intends to use slot 4 for normal beacon signal transmission. Also the first device 101 has chosen the same slot and thus a possible beacon collision is detected in step 509. If on the other hand no beacon collision possibility is detected, then the procedure continues in step 507.

Now that a possible beacon collision is detected in step 509, next the first device 101 chooses another beacon slot for beacon signal transmission. In this example slot 3 is chosen. Then in step 513 the first device 101 determines whether any other forecast beacons are received. If a new forecast beacon is received, then the procedure continues in step 509, but on the other hand if no other forecast beacons are detected, then the first device 101 transmits a forecast beacon in the contention period informing the other devices that it intends to use slot 3 for beacon signal transmission in the next contention period. The forecast beacon carries the intended beacon slot identifier (e.g. slot number) for its normal beacon to be sent in the next beacon period. The forecast beacon is not transmitted in the beacon period but in the contention access period. Thus, in accordance with this embodiment, each device has to transmit a forecast beacon in the contention period each time before it transmits its first normal beacon or before it changes the beacon slot for its normal beacon. The forecast beacon is transmitted using the carrier sense multiple access with collision avoidance (CSMA/CA) scheme after a random delay time from the start point of the contention period.

Once the first device 101 has transmitted the forecast beacon, the procedure continues in step 507 by transmitting in the chosen beacon slot in the next beacon period. As can be seen from FIG. 6, there is no beacon collision, since the first device 101 uses beacon slot 3, whereas the fifth device 105 uses the beacon slot 4.

It is also possible that in the above example the first device 101 and the fifth device 105 cannot hear each other, i.e. they are not within a communication range. In this case, however, there can be another device, for instance the third device 103 that receives the forecast beacons from the first and fifth devices. In the example above, the third device 103 would realise that both devices intend to transmit in slot 4. Also, the third device 103 could detect that the intended slot, in this case slot 4, might be occupied by other communication devices in its range.

Now the third device 103 tries to transmit a third type of a beacon signal, namely a so called collision warning beacon, immediately after the detection of the possible beacon collision. The transmission of the collision warning beacon should follow the CSMA/CA scheme as well. The collision warning beacon contains the information of the slot number, where the potential collision will happen, slot 4 in this example, and the device identifiers (first and third devices in this case) involved in the possible collision. In the device identifier list carried by the collision warning beacon, the device 105 should be superior to the first device 101, as the forecast beacon from the device 105 was received before the one from the first device 101. Thus, a new type of beacon, namely the collision warning beacon, is used for warning the neighbouring devices that a possible collision has been detected either by receiving two forecast beacons intending to use the same beacon slot in the next beacon period, or by noticing a forecast beacon intending to use a beacon slot that is already occupied by another neighbour. The collision warning beacon carries the information of beacon slot where a collision is foreseen and the sequence of device identifiers involved in the potential collision. The sequence order of the device identifiers can be so arranged to implicate the priorities that the devices may use the beacon slot.

On the reception of the collision warning beacon, the first device 101 will try to retransmit its forecast beacon with a newly picked beacon slot, i.e. slot 3 in this example, as its wished beacon slot. The potential collision is therefore solved before the next beacon period, although there is a hidden station problem. This situation is illustrated in FIG. 6. Thus, in accordance with this warning beacon feature, the flow chart of FIG. 5 could be modified so that after step 515, the first device is listening to warning beacons and in case a warning beacon shows a possible collision and, if the forecast beacon transmitted by the current device has a lower priority, then choosing another beacon slot. Also in steps 509 and 513 the current device can in addition to listening to the forecast beacons equally listen to warning beacons.

The teachings of the present invention can be applied to all wireless ad-hoc networks and wireless mesh networks, where stations use the distributed beaconing scheme to exchange information among neighbours. The present invention is particularly advantageous, when applied to vehicular communication systems, which have system structure based on the distributed beaconing scheme.

The invention equally relates to a computer program product that is able to implement any of the method steps of the embodiments of the invention when loaded and run on computer means of the communication devices.

The invention equally relates to an integrated circuit that is arranged to perform any of the method steps in accordance with the embodiments of the invention.

While the invention has been illustrated and described in detail in the drawings and foregoing description, such illustration and description are to be considered illustrative or exemplary and not restrictive; the invention is not restricted to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that different features are recited in mutually different dependent claims does not indicate that a combination of these features cannot be advantageously used.

A computer program may be stored/distributed on a suitable medium supplied together with or as a part of other hardware, but may also be distributed in other forms, such as via the Internet or other wired or wireless telecommunication systems. Any reference signs in the claims should not be construed as limiting the scope of the invention.

The invention claimed is:

1. A method of reducing beacon collision probability in a communication network supporting control channels comprising beacon periods divided into beacon slots, each beacon period being followed by a contention period, the method comprising:
choosing an available beacon slot for transmission of a beacon of a first type for exchanging information with other communication devices operating in the communication network, the transmission of the beacon of the first type to occur in a next consecutive beacon period;
transmitting a beacon of a second type comprising an identifier of the communication device and the chosen beacon slot for the transmission of the beacon of the first type, the beacon of the second type being transmitted in the contention period prior to the next consecutive beacon period; and
upon receiving, in the contention period from another communication device, a beacon of the second type indicating the intention of the another communication device to use the chosen beacon slot for transmission of the beacon of the first type, changing, during the contention period of the receiving, the chosen beacon slot of the communication device to another available beacon slot.

2. The method according to claim 1, further comprising transmitting the beacon of the first type in the beacon slot of the next beacon period.

3. The method according to claim 1, wherein the beacon of the second type is transmitted in accordance with a collision sense multiple access with collision avoidance scheme.

4. The method according to claim 1, wherein the beacon of the second type is transmitted after a predetermined delay period.

5. A method of reducing beacon collision probability in a communication network supporting control channels comprising beacon periods divided into beacon slots, each beacon period being followed by a contention period, the method comprising:
choosing an available beacon slot for transmission of a beacon of a first type for exchanging information with other communication devices operating in the communication network;
transmitting a beacon of a second type comprising an identifier of the communication device and the chosen beacon slot for the transmission of the beacon of the first type, the beacon of the second type being transmitted in the contention period;
receiving a beacon of a third type comprising identifiers of the communication devices that intend to use the same beacon slot for transmission of the beacon of the first type; and
upon receiving, in the contention period from another communication device, a beacon of the second type indicating the intention of the another communication device to use the chosen beacon slot for transmission of the beacon of the first type, changing the chosen beacon slot of the communication device to another available beacon slot.

6. The method according to claim 5, wherein the beacon of the third type further comprises an indication from which communication device the other communication device first received the beacon of the second type and the communication device using this information for deciding whether a new beacon slot needs to be chosen for transmission of the beacon of the first type.

7. A method of reducing beacon collision probability in a communication network supporting control channels comprising beacon periods divided into beacon slots, each beacon period being followed by a contention period, the method comprising:
choosing an available beacon slot for transmission of a beacon of a first type for exchanging information with other communication devices operating in the communication network;
transmitting a beacon of a second type comprising an identifier of the communication device and the chosen beacon slot for the transmission of the beacon of the first type, the beacon of the second type being transmitted in the contention period;

upon receiving, in the contention period from another communication device, a beacon of the second type indicating the intention of the another communication device to use the chosen beacon slot for transmission of the beacon of the first type, changing the chosen beacon slot of the communication device to another available beacon slot; and the communication device transmitting a beacon of a third type when detecting a possible collision of the beacons of the first type, the beacon of the third type comprising identifiers of the communication devices that intend to use the same beacon slot for transmission of the beacon of the first type.

8. A communication device in a communication network supporting control channels comprising beacon periods divided into beacon slots, each beacon period being followed by a contention period, the communication device comprising:

a selection unit adapted for choosing an available beacon slot for transmission of a beacon of a first type for exchanging information with other communication devices operating in the communication network, the transmission of the beacon of the first type to occur in a next consecutive beacon period;

a transmission unit adapted for transmitting a beacon of a second type comprising an identifier of the communication device and the chosen beacon slot for the transmission of the beacon of the first type, the beacon of the second type being transmitted in the contention period prior to the next consecutive beacon period; and a receiving unit adapted for receiving, in the contention period from another communication device, a beacon of the second type indicating the intention of the another communication device to use the chosen beacon slot for transmission of the beacon of the first type;

wherein the selection unit is further adapted for changing, during the contention period of the receiving, the chosen beacon slot of the communication device to another available beacon slot upon receiving in the receiving unit the beacon of the second type.

9. The communication device according to claim 8, further comprising a transmitter adapted for transmitting the beacon of the first type in the beacon slot of the next beacon period.

10. A communication device in a communication network supporting control channels comprising beacon periods divided into beacon slots, each beacon period being followed by a contention period, the communication device comprising:

a selection unit adapted for choosing an available beacon slot for transmission of a beacon of a first type for exchanging information with other communication devices operating in the communication network;

a transmission unit adapted for transmitting a beacon of a second type comprising an identifier of the communication device and the chosen beacon slot for the transmission of the beacon of the first type, the beacon of the second type being transmitted in the contention period; and a receiving unit adapted for receiving, in the contention period from another communication device, a beacon of the second type indicating the intention of the another communication device to use the chosen beacon slot for transmission of the beacon of the first wherein the selection unit is further adapted for changing the chosen beacon slot of the communication device to another available beacon slot upon receiving in the receiving unit the beacon of the second type; and wherein the receiving unit is further adapted for receiving a beacon of a third type comprising identifiers of the communication devices that intend to use the same beacon slot for transmission of the beacon of the first type.

11. The communication device according to claim 10, wherein the beacon of the third type further comprises an indication from which communication device the other communication device first received the beacon of the second type and the selection unit of the communication device is adapted to use this information to decide whether a new beacon slot needs to be chosen for transmission of the beacon of the first type.

12. A communication device in a communication network supporting control channels comprising beacon periods divided into beacon slots, each beacon period being followed by a contention period, the communication device comprising:

a selection unit adapted for choosing an available beacon slot for transmission of a beacon of a first type for exchanging information with other communication devices operating in the communication network;

a transmission unit adapted for transmitting a beacon of a second type comprising an identifier of the communication device and the chosen beacon slot for the transmission of the beacon of the first type, the beacon of the second type being transmitted in the contention period; and a receiving unit adapted for receiving, in the contention period from another communication device, a beacon of the second type indicating the intention of the another communication device to use the chosen beacon slot for transmission of the beacon of the first wherein the selection unit is further adapted for changing the chosen beacon slot of the communication device to another available beacon slot upon receiving in the receiving unit the beacon of the second type; and wherein the transmission unit of the communication device is further adapted for transmitting a beacon of a third type when detecting a possible collision of the beacons of the first type, the beacon of the third type comprising identifiers of the communication devices that intend to use the same beacon slot for transmission of the beacon of the first type.

* * * * *